United States Patent
Hartog et al.

[11] Patent Number: 5,821,861
[45] Date of Patent: Oct. 13, 1998

[54] MONITORING WALL TEMPERATURES OF REACTOR VESSELS

[75] Inventors: Arthur H. Hartog, Southampton; Dillwyn P. David, Eastleigh, both of Great Britain; Jakob J. Hamman; Marc J. Middendorp, both of Mossel Bay, South Africa

[73] Assignees: York Sensors Limited, Hampshire, United Kingdom; Mossgas (Pty) Limited, Mossell Bay, South Africa

[21] Appl. No.: 663,197

[22] PCT Filed: Oct. 3, 1995

[86] PCT No.: PCT/GB95/02343

§ 371 Date: Nov. 25, 1996

§ 102(e) Date: Nov. 25, 1996

[87] PCT Pub. No.: WO96/10735

PCT Pub. Date: Apr. 11, 1996

[30] Foreign Application Priority Data

Oct. 3, 1994 [ZA] South Africa .............. 94/7705

[51] Int. Cl.⁶ ........................................ G08B 17/00
[52] U.S. Cl. ............... 340/584; 340/588; 340/506; 356/44; 356/301; 374/116; 374/130; 374/131; 374/137; 250/227.18
[58] Field of Search ................... 340/584, 588, 340/506; 356/43, 44, 300, 301, 256; 374/100, 116, 137, 130, 131; 250/227.18, 227.14

[56] References Cited

U.S. PATENT DOCUMENTS

| 3,567,895 | 3/1971 | Paz ............................................. 219/667 |
| 4,384,793 | 5/1983 | O'Brien ...................................... 374/115 |
| 4,440,509 | 4/1984 | Agarwal ...................................... 374/166 |
| 4,703,175 | 10/1987 | Salows et al. ............................ 250/227 |
| 4,767,219 | 8/1988 | Bibby ......................................... 374/123 |
| 4,823,166 | 4/1989 | Hartog et al. ................................ 356/44 |
| 4,827,487 | 5/1989 | Twerdochlib ............................. 374/152 |
| 4,830,513 | 5/1989 | Grege ......................................... 374/131 |
| 5,094,702 | 3/1992 | Kothmann et al. ....................... 148/128 |
| 5,251,274 | 10/1993 | Carlstrom et al. .......................... 385/13 |
| 5,348,396 | 9/1994 | O'Rourke et al. ......................... 374/161 |

FOREIGN PATENT DOCUMENTS 572 238   5/1993   European Pat. Off. .
40 27 538  10/1991  Germany .

*Primary Examiner*—Thomas J. Mullen, Jr.
*Assistant Examiner*—Benjamin C. Lee
*Attorney, Agent, or Firm*—Rockey, Milnamow & Katz, Ltd.

[57] ABSTRACT

Wall temperatures of a reactor vessel are monitored by arranging an optical fibre in thermal contact with the wall and employing an optical time domain reflectometry system to monitor the respective temperatures at different points along the fibre. Such a monitoring method can be cheaper and more reliable than comparable prior art methods. An alarm may be triggered automatically when hot spots are detected.

15 Claims, 2 Drawing Sheets

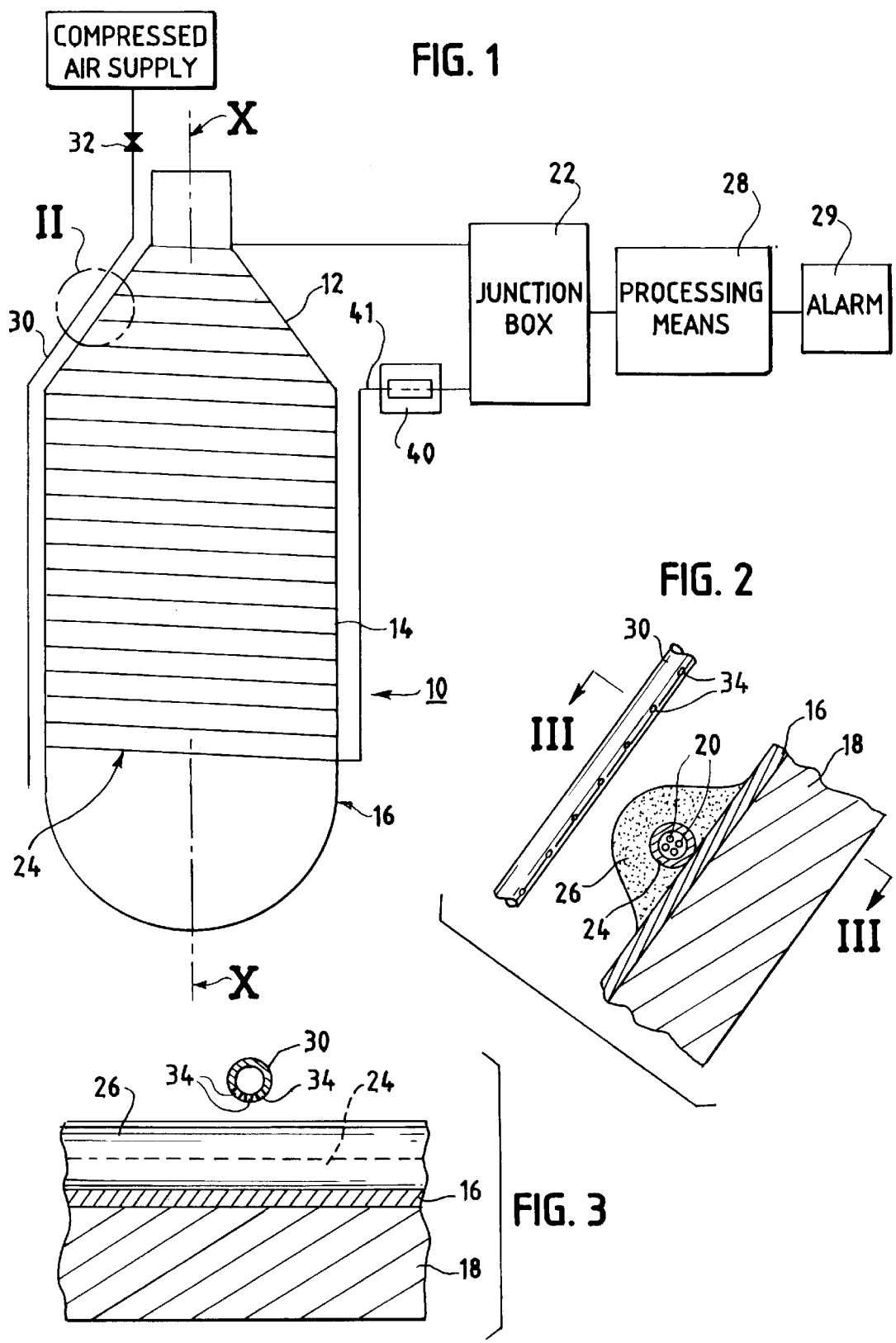

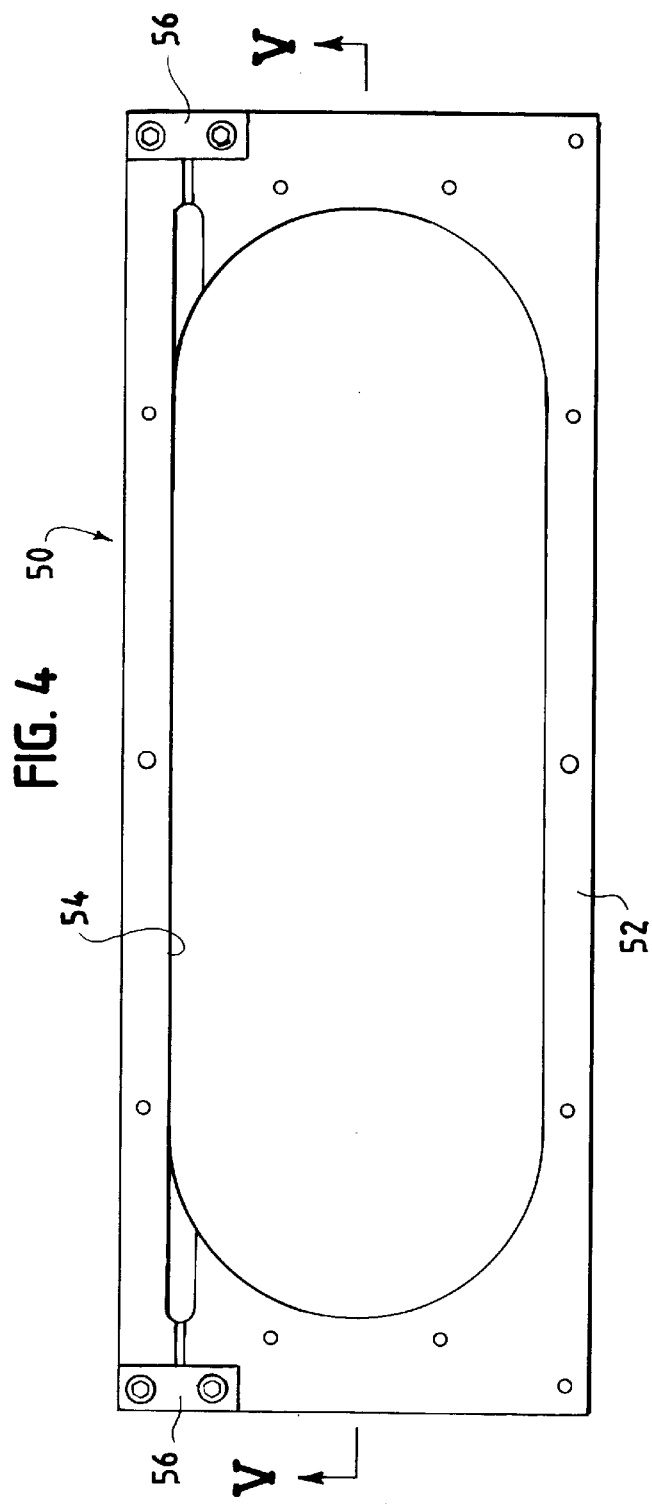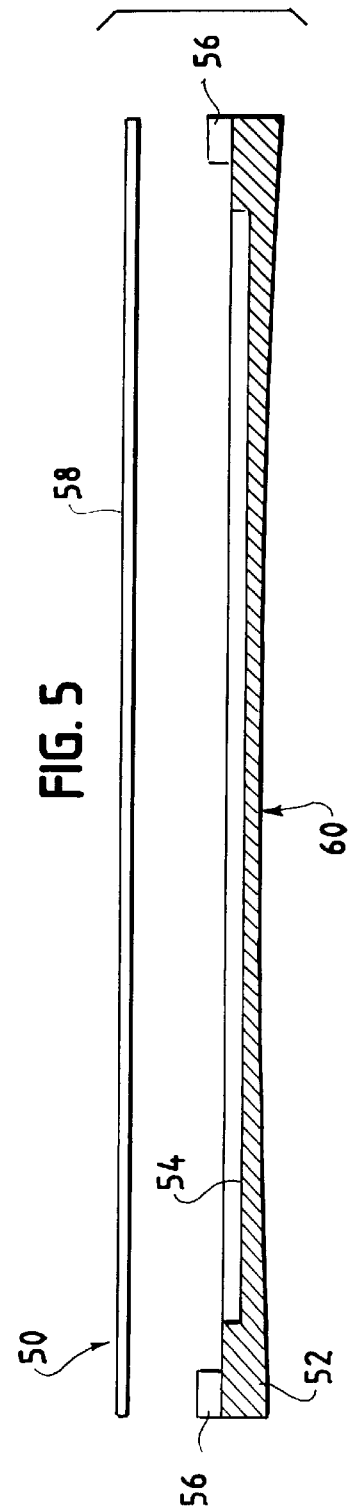

ns include the use of infra-red
MONITORING WALL TEMPERATURES OF REACTOR VESSELS The present invention relates to monitoring wall temperatures of reactor vessels such as, for example, a high temperature chemical reactor vessel as used in the petrochemical industry.

A high temperature refractory-lined reactor vessel of a type used in the petrochemical industry generally comprises an upright cylindrical side wall and a conical roof, the temperature in the vessel increasing from the bottom up. The wall (side wall and roof) of the reactor vessel is formed by a metal shell having on the inside thereof a refractory lining. Hot spots (localized overheating) can occur, particularly in the conical roof, and these can damage and eventually destroy the refractory lining of the vessel. If not detected early, hot spots can lead to general failure of the reactor vessel. It is therefore desirable that the development of a hot spot be detected as early as possible. In practice, hot spots tend to be small in extent (of the order of 150 mm in diameter) and this makes them difficult to detect.

Previously-considered methods of monitoring the shell temperature of reactor vessels include the use of infra-red scanners, thermocouples, and filamentary sensors of the type that rely on the temperature-dependent resistance of special semiconductor material between a pair of conductors. Infra-red scanners are expensive, and the data they capture is in the form of images which are difficult to store and process electronically. Thermocouples are also expensive, particularly if high resolution is required, as the resolution depends on the number of thermocouples per unit area.

A filamentary sensor of the above-mentioned type, whilst able to detect the development of a hot spot, does not enable one to pin-point readily the distance along its length where the hot spot occurs.

It is desirable to provide a system of monitoring the shell temperature of a reactor vessel in a way that is able to provide an accurate indication of the existence as well as location of a hot spot in the reactor vessel.

According to one aspect of the present invention there is provided a method of monitoring wall temperatures of a reactor vessel, wherein a length of optical fibre is arranged in thermal contact with a wall portion of the vessel, and an optical time domain reflectometry system is employed to monitor the respective temperatures at successive points along the said length of optical fibre.

Where the wall has axial symmetry, and the operating temperature of the vessel increases from one axial end thereof to the other, the optical fibre may advantageously be coiled helically, or spirally, about the axis of symmetry of the wall.

According to a second aspect of the present invention there is provided a reactor vessel installation, comprising a reactor vessel having a wall portion, a length of optical fibre arranged in thermal contact with the said wall portion, and optical time domain reflectometry processing means connected to the optical fibre for monitoring the respective temperatures at successive points along the said length of optical fibre.

Where the wall has axial symmetry, the optical fibre may be coiled helically, or spirally, about the axis of symmetry of the wall.

The installation may further include means operable selectively to change the temperature of the optical fibre locally, in a band which extends axially of the vessel. The said means may be in the form of an axially extending fluid line with lateral openings therein for directing jets of fluid onto the vessel in the said band.

The optical fibre may lead to an extended portion which is out of thermal contact with the wall of the vessel, the extended portion being provided with a heating pad to permit localised heating of the extended portion to a predetermined, accurately known temperature.

The optical fibre may be sheathed in a metal tube which is affixed to or embedded in the wall.

The wall may comprise a metal shell and a refractory lining internally of the shell, the metal tube being affixed to the outside of the shell by means of a heat conductive cement.

The optical fibre may be provided with a splice box affixed to the outside of the shell, the splice box having a curved configuration corresponding to the curvature of the shell.

The splice box may be affixed to the shell by means of a heat conductive cement.

The cement may be an epoxy-based heat transfer cement.

The cement may be that which is available in the trade as THERMFAS heat transfer cement 30–59 or a generically equivalent substance.

Reference will now be made, by way of example, to the accompanying drawings, in which:

FIG. 1 shows a diagrammatic side elevation of a high temperature refractory-lined reactor vessel to which an embodiment of the present invention is applied;

FIG. 2 shows, in a section corresponding to an axial plane of the vessel, a detail of the part indicated at II in FIG. 1;

FIG. 3 shows a section corresponding to a plane indicated at III—III in FIG. 2;

FIG. 4 shows a plan view of a splice box for use with optical fibres employed in the embodiment of FIG. 1; and FIG. 5 shows a section corresponding to a plane indicated at V—V in FIG. 4.

Referring first to FIGS. 1 to 3, reference numeral 10 indicates generally a high temperature refractory-lined reactor vessel of a type (sometimes known as a reformer vessel) that is used in the petrochemical industry. The vessel has axial symmetry, being cylindrically symmetrical about a central longitudinal axis X—X, and has a frusto-conical wall portion 12 at the top and a cylindrical or barrel-shaped wall portion 14 below the conical top. The vessel wall structure consists of a metal shell 16 lined internally with refractory material 18.

To monitor shell temperatures of the reactor vessel during operation, a cable-form bundle of optical fibres 20 (FIG. 2), encased in a tubular metal sheath 24, is arranged on the outside of the shell 16, in thermal contact therewith, and the fibres 20 are coupled, via a fibre optic field junction box 22, to processing equipment 28 located in a central control room.

The bundle of optical fibres 20 is wound around and axially along the reactor vessel 10 in a helical manner, there being a spacing of approximately 100 mm between adjacent turns. As can best be seen in FIG. 2, the metal sheath 24 encasing the bundle is affixed to the shell 16 by means of an epoxy based, heat conductive cement 26 within which the sheath is embedded. The cement 26 that has been found to give satisfactory results is the product that is available commercially under the designation THERMFAS heat transfer cement 30–59. The cement 26 holds the metal sheath 24 in position, provides for good thermal contact between the shell 16 and the sheath 24, and protects the sheath and the fibres from damage.

The shell temperatures are monitored by utilising the technique that is known generally as optical time domain reflectometry. With this technique a laser source (not shown) in the processing means 28 is used to launch a pulse of light into the optical fibres 20 in well-known manner. Although only one fibre is required, the metal sheath 24 contains four parallel fibres to provide for redundancy. As the pulse passes through the fibres, energy is lost owing to scattering. Scattering is due to variations in density and composition of the medium, molecular vibrations, and bulk vibrations. A fraction of the scattered signal is retained within the fibre and about half of this is directed back along the fibre towards the laser source, where the return signal is split off by a directional coupler, optically filtered, and presented to a detector, all in accordance with well-known techniques. By suitable conventional filtering, that component of the return signal that results from thermally driven molecular vibration is separated from the rest of the signal. The intensity of the return signal decays exponentially with time, given uniform losses within the fibre. Therefore, knowing the speed of propagation it is possible to relate intensity to distance, the position of a reading being calculated from the time taken for the light to travel out and back within the fibre, in well-known manner. The sampling interval is determined by the rate at which analogue-to-digital sampling takes place. The resolution is governed by the pulse width of the laser source. A laser source designed to launch a 10 ns pulse, and using a 10 ns sampling time, may be used to give a 1 m resolution at 1 m intervals.

The equipment can thus provide a trace of temperature against distance along the fibres. To enable the distance to be correlated with a position on the shell, a look-up table is generated, in accordance with generally known techniques, and this is referred to as "mapping". Whenever there has been a change in the configuration of the fibre loop, for example when it has been spliced to repair a break, it is necessary to produce a new look-up table, i.e. to re-map the system. To facilitate this, an air line 30 is installed which runs alongside the reactor vessel in an axial plane thereof, from its top to near its bottom, the air line being connected to a supply 33 of compressed air via a shut-off valve 32. The air line 30 has small holes 34 drilled therein along its entire length, to form a series of nozzles which are directed towards the shell 16. When a mapping operation is to be carried out, the valve 32 is opened so that compressed air at room temperature flows into the air line 30 and exits through the holes 34 as small jets of air which impinge on the shell. This causes localized cooling of a band-shaped region of the shell adjacent to the air line 30, and the cooled areas where the air line 30 crosses the fibre-containing sheath 24 show up in a temperature trace produced by the temperature monitoring system 28. This enables the system to be re-mapped rapidly, and with little effort, while the reactor vessel is on-line.

Additionally, to facilitate testing of the system for correct operation, a heating pad 40 is provided to heat a portion 41 of the optical fibre bundle near one of its ends. The portion.41 is not in contact with the shell 16, but is between the junction box 22 and the shell 16. The heating pad 40 comprises a temperature controlled heating element which can heat up a short section (approximately 300 mm long) of the fibre bundle to a predetermined, accurately controlled temperature. The heating element is switched on from time to time and a check performed to ascertain that this is detected by the equipment. Such localized heating of the optical fibre bundle would, if detected at a location where the fibre bundle is in thermal contact with the shell 16, indicate a hot spot which the equipment is expected to detect.

If a break occurs in the fibres 20, a splice box 50 (FIGS. 4 and 5) is used to effect a repair. The splice box consists of a 300 mm by 100 mm by 1 mm aluminium block 52 which has a 4 mm deep well 54 machined in a front face thereof and, at each opposite end thereof, a clamp 56 for holding opposing ends of the metal sheath 24 of the optical fibre bundle that are to be reconnected. The broken ends of the optical fibres are prepared in conventional manner, and a length of additional optical fibre bundle is inserted between and spliced to the prepared ends, so as to bridge the break in the fibres. The additional length of optical fibre bundle is coiled up in the well 54, so as to prevent the fibres from being subjected to mechanical strain. The well 54 is then closed by means of a stainless steel plate 58.

The aluminium block 52 has a concavely curved rear face 60, the radius of curvature corresponding to the radius of curvature of the cylindrical portion of the shell 16, and the block 52 is secured to the shell by means of a heat conducting cement such as that referred to above, because of the materials used, the splice box 50 is light, and the curved rear face 60 enables the splice box to be attached to the shell sufficiently securely to prevent the box from coming loose and falling off.

The system allows alarms to be set for the fibre as a whole, or for individual zones corresponding respectively to all points along the fibres that are resolvable positionally from one another.

A difficulty in setting up alarm levels is caused by the two following factors:

(a) The surface of the reactor vessel is not normally completely uniform. There are side-to-side (azimuthal) as well as top-to-bottom variations.

(b) The surface of the reactor vessel is not stable in time. Apart from changes due to the vessel warm-up, normal variations in the process may be expected to cause small wall temperature fluctuations. To allow for this phenomenon, the alarm level must be a function of time.

Associated with these problems is the fact that hot spots can arise which are smaller than the 1 m resolution referred to above, and therefore the temperature alarm levels should preferably be scaled so as to ensure that an alarm is activated when the fibre detects a temperature equivalent to that produced by the minimum specified hot-spot size reaching the selected alarm temperature. The system is required to initiate an alarm automatically, for example, when a hot-spot of 150 mm diameter has reached $350°$ C.$\pm 20°$ C., the local vessel wall temperature being in the range from $120°$ C. to $250°$ C.

The hot-spot is assumed to be Gaussian in thermal profile and the diameter is taken to be defined as its full width at half-maximum. An additional signal processing module may be included to improve the detection of small hot spots using both time and spatial filtering. The filtering is designed to eliminate quasi-static non-uniformities. The spatial filtering provides additional discrimination against rapid fluctuations over a large shell area caused, for example, by sudden changes in weather (e.g. wind, rain, sun)

The time filtering may be summarised as follows. An historical thermal map (Tf—not shown) is built up (in a manner that will be readily apparent to the skilled reader) of the reactor vessel surface (providing a time-averaged temperature value for each monitored data point along the fibres). The time constant applied in producing this map is relatively long, for example 1–2 hours, so the map will adapt to slow changes in the surface temperatures of the vessel but will not react on the time scale of a hot-spot formation. The time constant should be set to as long a value as is consistent with tracking normal variations in the vessel temperature profile, and may in some cases be of the order of 24 hours. In the course of the monitoring process the historical thermal map (Tf) values are subtracted from current temperature measurements to provide a map (Td) of recent changes in the vessel temperature. The temperature difference data may be low-pass filtered with a shorter time constant, for example 1–2 minutes, if required to improve the noise characteristics, thereby providing a new data map (Tds). The alarm testing on the time-filtered data is then designed to activate an alarm 29 if, for any monitored point (z) along the fibres, $$Tds(z) > (Ta - Tf(z)).\text{constant},$$

where Ta is the selected alarm level (eg 350° C.). It is the difference between this alarm level and the historical ambient level that the alarm processing tests for. The system thus detects a rise from the existing (historical) temperature to the alarm temperature. The constant in the expression above is selected in such a manner as to scale the effective alarm threshold value, at different points along the fibre, so as to increase the effective threshold value as Tf(z) approaches Ta.

However, if the spatial resolution of the system (comprised of the reflectometry processing means 28 and the connected fibres 20) is 1 m, for example, and the sampling interval employed in the processing corresponds to a spacing of 0.25 m, this aforedescribed processing system may be inhibited from activating the alarm 29 if the temperatures at more than four consecutive monitored points are above the threshold at the same time. A more basic additional processing method performed within the processing means 28, which method simply compares the raw currently-sensed temperature data directly with the threshold Ta, can be relied upon to activate the alarm 29 reliably if the wall temperature is above Ta over a distance (covering more than four consecutive points in the example described) greater than the spatial resolution of the system as a whole.

Spatial filtering may be also be applied to the Tds data to reduce the effects of rapid changes to a large part of the vessel that may be caused for example by weather changes. Before being subjected to the alarm threshold testing, the time-filtered difference data Tds are passed through a spatial filter having band-pass characteristics. The upper cut-off spatial frequency of the filter corresponds substantially to the spatial resolution of the reflectometry system (including the optical fibres), so as to exclude noise at spatial frequencies above that corresponding to the spatial resolution of the system, and may for example be about 1–2 per meter. The lower cut-off frequency of this spatial band-pass filter should be lower than the upper cut-off frequency by a factor of at least 2, to remove variations covering anything significantly larger than a hot-spot, and may for example be of the order of 1 every 4–5 meters.

Circuitry details of the processing equipment 28 are not given here, since it will be readily appreciated by the appropriately skilled reader that all of the required processing steps can be put into effect by the routine application of conventional principles, and that it will generally be most practical to carry out the processing by software means.

We claim:

1. A reactor vessel installation, comprising:
   a reactor vessel having a wall portion, a length of optical fibre arranged in thermal contact with the said wall portion, and an optical time domain reflectometry processor connected to the optical fibre for monitoring the respective temperatures at successive points along the said length of optical fiber,
   wherein the said processor includes:
      first low-pass filtering means for producing a time-averaged thermal map of the said wall portion from a series of respective temperature measurements at the said successive points along the fibre,
      difference-detecting means for determining difference data indicative of the difference between a current temperature measurement at each of the said successive points and a corresponding value given by the said thermal map for that point,
      second low-pass filtering means for time-filtering the said difference data, the second low-pass filtering means having a time constant shorter than that of the first low-pass filtering means,
      alarm means, and
      threshold means for activating the alarm means if an output signal from the said second low-pass filtering means exceeds a scaled value produced in dependence upon the difference between a corresponding thermal map value and a desired alarm threshold value.

2. An installation as in claim 1, wherein the optical fibre has an extension portion, outside the said length, that is out of thermal contact with the said wall portion, and wherein a heating pad is provided adjacent to the said extension portion to permit localized selective heating of that portion to a predetermined known temperature.

3. An installation as in claim 1, including means for inhibiting the alarm means from being activated in dependence on such an output signal from the said second low-pass filtering means if more than a preselected number of consecutive monitored points, arrayed from one end to the other of a part of the optical fibre that is equal in length to the spatial resolution of the optical time domain reflectometry system comprised of the processing means and the optical fibre, simultaneously provide output signals, from the second low-pass filtering means, that exceed such respective corresponding scaled values.

4. An installation as in claim 1, wherein the said wall portion has axial symmetry, and the optical fibre is coiled helically around the said wall portion so as to extend around and along an axis of symmetry of the wall portion.

5. An installation as in claim 4, wherein the operating temperature of the said wall portion increases from one axial end thereof to the other.

6. An installation as in claim 1, further including temperature changing means for bringing about localized changes of temperature of the optical fibre at respective preselected points therealong.

7. An installation as in claim 6, wherein the temperature-changing means includes a fluid line arranged so as to cross the optical fibre at the said preselected points and formed with lateral openings therein for directing jets of fluid from the line towards the said wall portion.

8. An installation as claimed in claim 1, wherein the said difference data is produced by an element which passes the difference values, between the current temperature measurements at the said successive points and the respective corresponding thermal map values, through band-pass spatial filtering means, having upper and lower cut-off frequencies, the lower cut-off frequency being lower than the upper cut-off frequency by a factor of at least 2.

9. An installation as in claim 8, wherein the said upper cut-off frequency corresponds substantially to the spatial resolution of the optical time domain reflectometry system which includes the processing means and the optical fibre.

10. An installation as in claim 1, wherein the optical fibre is sheathed in a metal tube which is carried by said wall portion.

11. An installation as in claim 10, wherein the outside surface of the said shell portion is curved, and a break in the said length of optical fibre is bridged with the aid of a splice box affixed to the outside of the shell portion, the splice box surface adjacent to the shell portion having a curved configuration corresponding to the curvature of the shell portion.

12. An installation as in claim 11, wherein the splice box is affixed to the shell portion by a heat conductive cement.

13. An installation as in claim 10, wherein the said wall portion includes a metal shell portion having a refractory lining, the metal tube being affixed to the outside of the shell portion by means of a heat conductive cement.

14. An installation as in claim 13, wherein the cement is an epoxy-based heat transfer cement.

15. An installation as in claim 14, wherein the cement is that which is available commercially as THERMFAS heat transfer cement 30–59, or a generically equivalent.

* * * * *